United States Patent [19]
Maillard et al.

[11] 3,798,536
[45] Mar. 19, 1974

[54] DEVICE FOR DETECTING LEAKAGES BY USING HELIUM AS A TRACER GAS

[76] Inventors: Pierre Maillard, 44 Avenue de la Paix, 44-Donges; Pierre Roubeau, Place de la Gare de Lozere, 91-Palaiseau, both of France

[22] Filed: Mar. 26, 1971

[21] Appl. No.: 128,454

[30] Foreign Application Priority Data
Mar. 26, 1970 France .............................. 7010898

[52] U.S. Cl. .................................... 324/33, 73/40.7
[51] Int. Cl. ...................... G01m 3/26, G01n 27/62
[58] Field of Search .............. 324/33; 417/901, 49; 55/323; 73/29, 40.7; 340/237

[56] References Cited
UNITED STATES PATENTS
2,863,315  12/1958  Penning .............................. 73/40.7
3,324,729  6/1967  Vanderslice ......................... 73/40.7
3,280,619  11/1966  Spies ..................................... 324/33
3,536,418  10/1970  Breaux ................................. 417/49
3,593,499  7/1971  Kile ...................................... 55/323
3,411,073  11/1968  Marr .................................... 324/33

Primary Examiner—Gerard R. Strecker
Attorney, Agent, or Firm—Craig and Antonelli

[57] ABSTRACT

A device for detecting leakages through the walls of an enclosure which includes a tube containing a material which blocks the passage of all gases except helium and having a gas receiving end capable of receiving gases from a wall which is to be detected, and an ion pump connected to the other end of the tube having an ammeter connected thereto to provide an indication of the residual pressure of the helium passing through said material.

1 Claim, 1 Drawing Figure

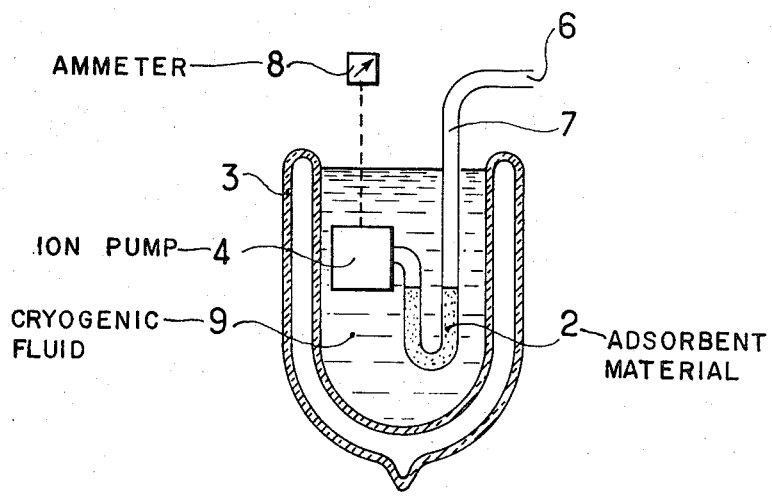

DEVICE FOR DETECTING LEAKAGES BY USING HELIUM AS A TRACER GAS

The present invention relates to a device for detecting leakages through the walls of an enclosure or envelope, this device being of a type which uses helium as a tracer gas. Devices of this type make it possible to check the gas-tightness of a wall by detection of very small quantities of helium in gaseous mixture passing through the wall.

Already known, particularly in this very field, is a device which was the object of our French patent application No. EN 6932069 of Sept. 19, 1969, for "Improvements Relative to Devices for Detecting Leakages by Using Helium As Tracer Gas." In this prior device there is disposed upstream of the detector, and preferably as close as possible to the latter, an adsorbent element capable of checking or adsorbing all gases with the exception of helium, and this adsorbent element consists advantageously of a tube equipped with an adsorptive product (preferably an activated vegetable charcoal) which is cooled to the temperature at which it is most effective by emersing it into a refrigerating enclosure, for example a Dewar vessel filled with liquid nitrogen.

The present invention is concerned with and directed to a device for the detection of leakages through the walls of an enclosure using helium as a tracer gas, and this device is characterized by virtue of the fact that it comprises, in series, an adsorbent element capable of stopping all gases having an atomic number higher than helium, and a unit for pumping and detecting the helium, this group or unit comprising pressure-measuring means and pumping means.

According to one embodiment of the present invention, the pressure-measuring means and the aforementioned pumping means comprise an ion pump which fulfills the double role of pumping and measuring the pressure. It is known in fact that for a given voltage which is applied to an ion pump, the ion current is essentially proportional to the pressure. Furthermore, in accordance with the same embodiment, the entire device, or at least a part of the detecting device, is immersed in liquid nitrogen.

Other characteristics and advantages of the present invention will become more apparent from the following detailed description of one embodiment according to the present invention, which has been described solely by way of example, and is not to be construed as limitative in any way, when taken in connection with the accompanying drawing, wherein the sole FIGURE is the diagram of a device as proposed by the present invention comprising an ion pump emersed in liquid nitrogen.

In the embodiment according to the present invention shown in the drawing, the ion pump 4 advantageously is emersed in liquid nitrogen 9 contained in a Dewar vessel 3 and is connected to an ammeter 8 which has a scale graduated in pressure and measures the ion current. Thus, the quantity of helium which passes through the wall of the vessel to be tested is determined by the residual pressure of the helium at the input of the ion pump 4, as indicated by the ion current of the pump measured by the ammeter 8.

The pump 4 is an ion pump which, in contrast to the pumps of a different type, assures a high speed of pumping of hydrogen. This gas is only very little present in the air but the walls of certain enclosures can release a certain quantity thereof which is capable of producing a troublesome background noise in the measure of helium. In view of the fact that this hydrogen is also only to a small extent adsorbed by the activated charcoal 2, it is obviously very advantageous to put into operation an ion pump 4 which rapidly aspirates it so that a correct measure of the quantity of helium can be obtained.

The device comprises a tube 7 containing activated vegetable charcoal 2, immersed in the Dewar vessel 3 which is filled with liquid nitrogen 9, the tube 7 communicating at 6 with the portion of the installation at which the leakages are to be detected.

The combination of the activated vegetable charcoal 2 cooled by liquid nitrogen 9 and the ion pump 4, which plays a double role of pressure-measuring and pumping makes it possible to work with installations at high pressure while still preserving the extreme sensitivity of the ion pump which is adapted to measure leakages in the order of $3.10^{-11}$ at cm$^3$/sec.

In the embodiment described hereinabove, maximum results are obtained by immersing the entire group or unit consisting of the portion of the tube 7 containing the activated vegetable charcoal and the ion pump 4 into the liquid nitrogen 9 since this reduces the degassing, which makes it possible to use shorter ducts and reduces the dead volume with an attendant reduction of the background noise and a reduction of the response and recovery time.

It is understood that the present invention has been described only by way of example and in no way in a limitative manner, and that it is quite possible to provide any modifications thereon with regard to detail without departing from the spirit and scope of the invention.

What is claimed is:

1. A device for detecting leakages through the walls of an enclosure, using helium as a tracer, comprising means for conveying gases from a wall to be tested including a tube having an input end forming a probe for receiving gases from said wall, an adsorbent element in the form of activated vegetable charcoal filling a portion of said tube so as to be capable of stopping substantially all gases with the exception of helium and any hydrogen that may be present, and means for pumping and detecting the helium by measuring the residual pressure thereof at the output of the adsorbent element, said pumping and detecting means being provided in the form of an ion pump connected to an output end of said tube and means connected to said pump for measuring the ion current of said ion pump, both the portion of the tube containing said adsorbent element and said ion pump being immersed in a cryogenic fluid, said ion pump serving to aspirate any of said hydrogen so that a correct measure of the helium pressure can be obtained.

* * * * *